Jan. 5, 1943. J. O. REED 2,307,078
PROCESS FOR REFINING OLEORESIN
Filed March 27, 1941

INVENTOR
Jesse O. Reed

BY
ATTORNEY

Patented Jan. 5, 1943

2,307,078

UNITED STATES PATENT OFFICE 2,307,078

PROCESS FOR REFINING OLEORESIN

Jesse O. Reed, Washington, D. C., assignor to Claude R. Wickard, as Secretary of Agriculture of the United States of America, and to his successors in office Application March 27, 1941, Serial No. 385,509

1 Claim. (Cl. 260—109)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to a process for refining or washing oleoresin.

The object of this invention is to provide a process for removing or washing from dirt-free oleoresin water-soluble materials which are either held in suspension or dissolved by oleoresin.

A preferred form of the apparatus is illustrated in the accompanying drawing, in which similar numerals refer to similar parts throughout the views.

Figure 2:
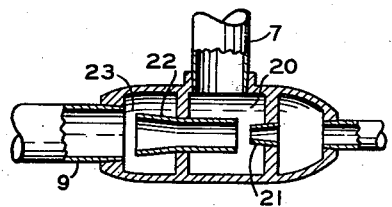
Figure 2 is a cross-sectional view of the water jet or mixing valve, shown as part of the apparatus shown in Figure 1.
Figure 1:
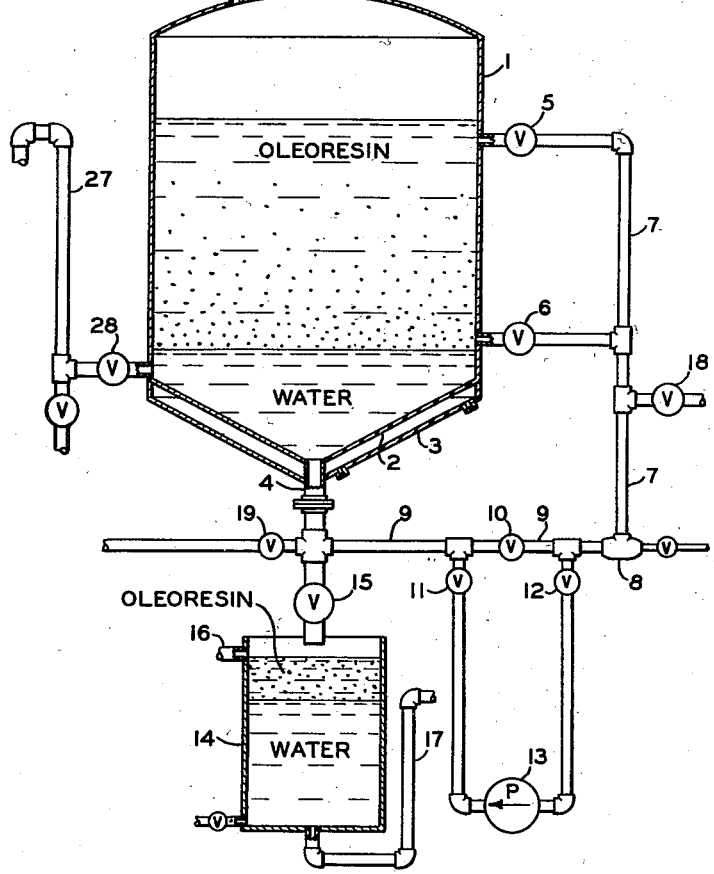
Figure 1 is a vertical sectional view of my apparatus.

The apparatus, which I may use in the operation of my invention, consists essentially of a tank 1 with a conical or funnel-shaped bottom 2 fitted with steam jacket 3 and opening 4. Valves 5 and 6 control openings on the side of the tank and connect to feed pipe 7, which leads to water jet or mixing valve 8. Water jet or mixing valve 8 feeds in pipe 9 leading to opening 4 in bottom of tank. Valves 10, 11 and 12 permit the bypassing of material in pipe 9 through pump 13. Tank 1 is emptied into receiving tank 14 through valve 15. Receiving tank 14 is fitted with outlet 16 and water drain pipe 17, which combination automatically and continuously separates oleoresin residue from water. The oleoresin to be refined in tank 1 enters opening 4 through valve 19, and the refined products are discharged through valve 18.

By referring to Figure 2, it will be seen that the water jet or mixing valve 8 consists of chamber 20, nozzle 21, throat piece 22, and exhaust chamber 23.

Opening 24 on the top of tank 1 connects to a reflux condenser 25.

Additional water can be added to the tank through valve 26 on top of tank. The added water in settling through the top layer of oleoresin gives added washing effect. By adjusting the height of pipe 27 leading from valve 28 it is possible to obtain a continual flow or discharge of the wash water from the tank for a certain level of gum and water within said tank 1.

In operation, previously filtered hot oleoresin that has been diluted to a turpentine content of at least 35%, is fed into tank 1 through valve 19 and opening 4. In conical bottom 2 of tank 1 is a layer of hot water maintained at a temperature of approximately 185° F. by means of steam jacket 3. The filtered and diluted oleoresin, because of its turpentine content of at least 35%, rises and floats on the water layer. The oleoresin receives a preliminary washing treatment when it rises through the heated water layer. Moreover, a substantial part of the water, which is carried into the tank along with the filtered and diluted oleoresin, remains in the water layer and thereby becomes separated from the filtered oleoresin. The oleoresin layer formed on the top of the water is emulsified and retains some suspended and dissolved water. All such retained water, either held in solution or in suspension in the oleoresin layer, contains water-soluble materials. Some of this suspended water will settle after a period of approximately 1 hour.

After settling for 1 hour, or longer (the time of settling is not of vital importance if within reasonable limits, as for instance over-night), the oleoresin layer is washed by being withdrawn from tank 1 through valves 5 and 6 and reintroduced in the water layer in conical bottom 2 of tank 1. Means for withdrawing the oleoresin through valves 5 and 6 and into pipe 7 is provided by water jet or mixing valve 8, shown in detail in Figure 2. The settled oleoresin enters water jet or mixing valve 8 through pipe 7 and into chamber 20, where a high-velocity jet of hot water from nozzle 21 causes the oleoresin to flow along with the hot water into tapered discharge or throat piece 22 and thence into outlet chamber 23, which connects to pipe 9. Throat piece 22 is designed so that it will change the velocity of the water into a pressure sufficient to discharge both the water and oleoresin against the back pressure of the material within tank 1. In addition to the washing action accomplished by the water within the bottom of the tank, additional and more effective washing results from the more intimate contact of the oleoresin and water in hot water mixing valve 8. A very thorough and copious washing of the filtered and diluted oleoresin results. The water containing water solubles held in solution in the diluted hot oleoresin is washed out and the water which remains in solution in the gum after washing is substantially free of water-soluble materials.

In case the oleoresin has characteristics which would create a too stable emulsion if mixing valve 8 were used, provision is made for washing the oleoresin by means of pump 13 controlled by valves 10, 11 and 12, forcing the said oleoresin through opening 4 and into the water in the bottom of tank 1. In this case, little or no hot water will be added through nozzle 21.

After another short period of settling, the washed oleoresin is withdrawn through valve 18, and is ready to be transmitted to distillation equipment, or a storage container.

The wash water in the bottom of tank 1 is drawn off through opening 4 and valve 15 into separator 14 fitted with opening 16 and pipe 17 so that the water which settles to the bottom of said separator 14 discharges continuously through pipe 17 and any refuse oleoresin will be discharged automatically through opening 16.

Vapors of turpentine emanating from the top layer of oleoresin in tank 1 are condensed and returned to said tank 1 from reflux condenser 25 through opening 24.

I may pack or place ceramic materials within the bottom of tank 1 and in the water layer, in order to serve as a means for increasing the surface contact between the water and oleoresin, and thereby obtain a better washing of the oleoresin.

Having thus described my invention, what I claim for Letters Patent is:

A process for refining oleoresin in emulsion form, which comprises heating and diluting emulsified oleoresin with turpentine in an amount sufficient to break the emulsion and to lower the specific gravity below that of water, thence permitting the diluted oleoresin to rise in a static column of water, thence passing the supernatant liquid, which comprises substantially turpentine-diluted oleoresin, through a jet of water thereby temporarily breaking up the oleoresin into particles in a water medium, thence introducing said oleoresin at the bottom of a column of water while the temporary condition exists, and thence recovering the refined oleoresin at the top of said column of water.

JESSE O. REED.